United States Patent [19]

Slocum

[11] Patent Number: 4,606,696
[45] Date of Patent: Aug. 19, 1986

[54] MECHANISM TO DETERMINE POSITION AND ORIENTATION IN SPACE

[76] Inventor: Alexander H. Slocum, P.O. Box 268, 1290 Balls Hill Rd., McLean, Va. 22101

[21] Appl. No.: 624,256

[22] Filed: Jun. 25, 1984

[51] Int. Cl.⁴ .............................................. B66C 23/00
[52] U.S. Cl. ................................. 414/744 R; 414/730; 901/9; 901/15; 901/46
[58] Field of Search .................. 414/730, 735, 744 R; 901/9, 15, 27, 46, 47

[56] References Cited

U.S. PATENT DOCUMENTS

| | | | |
|---|---|---|---|
| 3,890,552 | 6/1975 | Devol et al. | 414/730 |
| 4,068,156 | 1/1978 | Johnson et al. | 901/15 |
| 4,119,212 | 10/1978 | Flemming | 414/730 |
| 4,218,172 | 8/1980 | Freund | 414/730 |
| 4,348,731 | 9/1982 | Kogawa | 414/730 |
| 4,453,085 | 6/1984 | Pryor | 901/47 |

OTHER PUBLICATIONS

*Koordinatentransformation bei Industrierobotern,* etz Bd 103 (1982) Heft 14, pp. 773-778.

Primary Examiner—Joseph E. Valenza
Attorney, Agent, or Firm—Robert Shaw

[57] ABSTRACT

A mechanism to determine position and orientation in space of a robot linkage or the like. The mechanism typically includes a plurality of structural beams that form the linkage and each structural beam has an associated measuring beam which, in the preferred embodiment, is housed within the structural beam in a way that deflection of the structural beam does not impose loads on the measuring beam. Angular measuring devices and linear measuring devices serve to locate endpoints of the measuring beam and the information derived serves to locate the free end or endpoint (typically a gripper or the like) relative to an anchor to establish position and orientation at the endpoint.

38 Claims, 14 Drawing Figures

MECHANISM TO DETERMINE POSITION AND ORIENTATION IN SPACE

The present invention relates to a mechanism to determine position and orientation in space for robots of the type used in an industrial environment, for example, but it has broader uses.

Robots today are designed more like machine tools than the humans which they are meant to free from dangerous and boring tasks. In general, robots are composed of a series of links connected by sliding or rotating joints whose relative positions are controlled by some sort of motor or actuator. The motors are controlled with closed-loop control, but the loop is closed only around a particular motor. As an example, one can consider a cantilever beam. At the wall the slope of the beam is held equal to zero but the tip of the beam can be forced into a variety of positions which cannot be determined from the slope at the wall. This same principle requires present-day robots to be designed and buit for maximum stiffness, not maximum stress, which gives them a payload-to-weight ratio on the order of 1:20 to 1:100. Also, to avoid excessive vibrations of the structure, most robots move slowly and are controlled assuming a quasi-steady motion. Also, as the robot ages its accuracy and repeatability decreases due to built-up wear of the bearings and gear trains. All the above factors cause robots to be far less glamorous and useful than society views them and perhaps that is why so few have actually been installed as compared to their potential. Most small batch jobs are still done by hand and virtually all large production runs are handled by transfer line machinery.

Accordingly, it is an objective of the present invention to provide a robot guidance system that overcomes the problems herein discussed, one that provides position and orientation information of the many degrees of freedom needed in an articulating robot to mimic the moves of a human.

Another objective is to provide a robot guidance system that is relatively inexpensive to fabricate and maintain, one that provides instantaneous endpoint information to allow real time determination of the location of a point in space with respect to a known reference point, that is, a system that can follow the endpoint location as it moves—even at high frequencies (presently proposed laser and acoustic systems are frequency limited).

Still another objective is to provide an analog measuring system which is much faster in responding, more reliable and easier to maintain than presently available systems.

A further objective is to provide a system that senses vibrations and, hence, can supply information to allow displacements caused by vibrations to be compensated for and damped out by actions of the actuators which control the robot's position.

These and still further objectives are addressed hereinafter.

The foregoing objectives are attained, generally, in a mechanism to determine the exact endpoint position of a linkage, that comprises: a structural beam for supporting a load at one end thereof and being attached at the other end thereof to an anchor (i.e., to a reference coordinate system that may be fixed or movable) that provides a reference line and a reference point, which structural beam is free to pivot with respect to said anchor; a measuring beam that is employed in measurement of lengths of the structural beam and angles between the structural beam and the measuring beam, said measuring beam being pinned at each end thereof in the vicinity of the respective joint axis of the structural beam (each endpoint of the structural beam is considered to be a joint axis) such that any deflection of the structural beam does not impose any loads on the measuring beam; an angular measuring device disposed at least at one joint axis of the measuring beam to measure any angle between the reference axis of the measuring beam and the neutral axis of the free end of the structural beam and to measure the angle between the measuring beam and the reference line in said anchor coordinate system; and a linear measuring device that provides measurements needed to determine the distance between said known endpoints of the measuring beam.

The invention is hereinafter described with reference to the accompanying drawing in which:

FIG. 1 is a schematic which shows the configuration of a two-link robot as assumed by a robot controller and the actual configuration;

FIGS. 2A, 2B, and 2C are schematics which show a robot structural beam in several stages of bending, and how a measuring beam detects the true endpoint position, independent of load;

Before going into detail regarding the present system, it may be useful to discuss some more general aspects. Robots typically have two or more arms (or links) in a multiple linkage arrangement; the base end is attached to an anchor that serves as a reference coordinate system with respect to which the links pivot and twist. All robots use some sort of prime mover (actuator) to cause the arms to move to a desired position or along a desired path and perform some function. Pick and place of objects, welding and painting, are some of the many tasks they are called upon to perform. Typically the linkage has a gripper or the like at the endpoint of the last link; it is necessary to know with great accuracy (~0.001 inch) the exact location and orientation of that gripper or the link with respect to the coordinate system of the anchor if the robot is to be used for more complex tasks such as assembly of parts.

Figure 1:
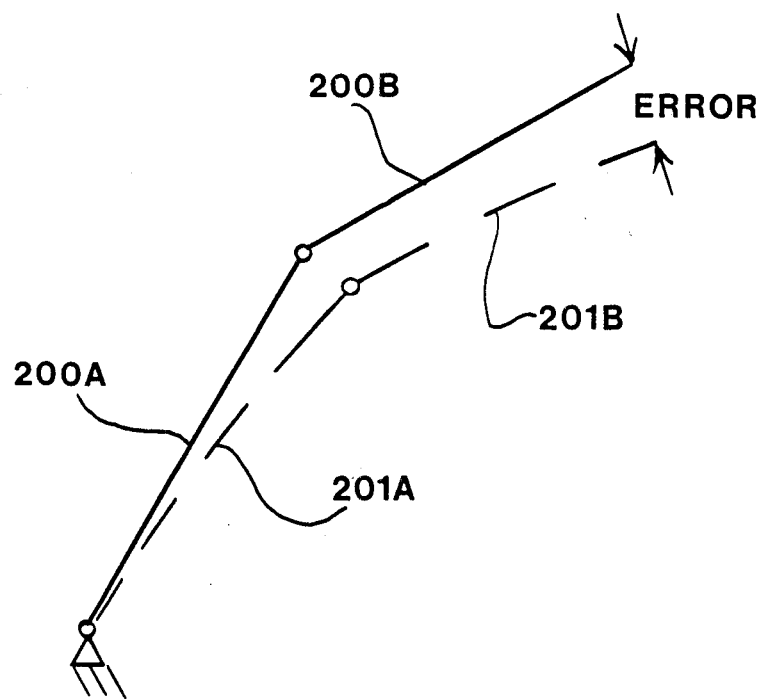
Figure 3:
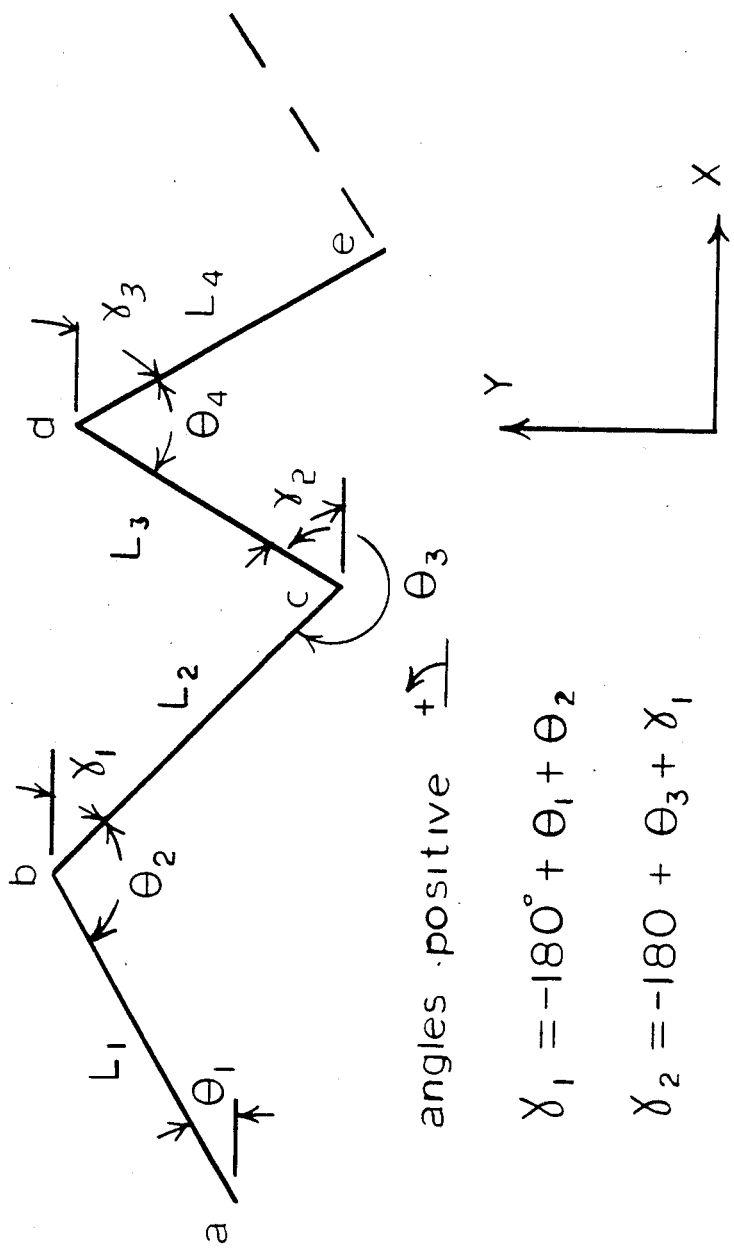
FIG. 3 is a schematic of a series of articulating links that could form a robot to show the lengths of measuring beams and the angles between the beams that a robot's computer controller would receive as input.

The endpoint position and orientation of linkage is determined by measuring (electronically) the relative angles between the arms, assuming the arms are perfectly straight, and then solving a simple geometry problem. Unfortunately all robot arms bend, even under their own weight, and the bearings in the joints are not perfectly round, especially when loaded. When a weight is held by the robot gripper, the problem is further compounded. Robots with minimal deflection are as a rule, large, heavy and can lift only very light weights (50 pounds). Their endpoint accuracies vary from ±0.001" for small 5–10 pound payload robots with a 2'–4' reach, to ±0.020" for 8' reach 150 pound payload robots. The endpoint problem is shown in FIG. 1, where the straight lines labeled 200A and 200B indicate the information that the robot controller receives and the curved lines labeled 201A and 201B indicate the actual physical situation. (In FIG. 3, as later pointed out, there is shown a multiple link linkage consisting of links $L_1$, $L_2$, $L_3$, $L_4$ . . . , the linkage being anchored at a, the link $L_1$ having an endpoint at b, the link $L_2$ having an endpoint at c, the link $L_3$ having an endpoint at d, the link $L_4$ having an endpoint at e, and so forth. If it is assumed for now that the links $L_1$ . . . are what is called herein structural beams, the issue is that of establishing the location of the joints b, c . . . relative to the anchor a to within a given error tolerance. While the system of FIG. 3 is in a single plane, the three-dimensional model, such as the structure in FIG. 6, includes twist as well as linear movements.)

To overcome the problem of endpoint location, researchers have looked at numerous ways of increasing the stiffness of robots. People have accepted the basic laws of beam theory and have moved on toward many solutions for endpoint determination. Among the more popular ones are:

1. Vision systems to allow the robot to see where it is going.
2. Laser endpoint determination to find the endpoint with respect to a fixed external point.
3. Compliance mechanisms to allow the robot to "feel" how the object should fit.

All of these have several things in common: they are bulky, complicated, delicate, and unnecessarily expensive. The industrialist of today needs a simple, inexpensive, rugged robot to tolerate the most abusive environment and personnel.

The closes researchers have come to solving the problem has been to suggest the use of an external laser to track the robot's endpoint (e.g., a gripper or other working instrument.) This solution, however, does not allow the robot to work in restricted motion areas or dirty environments where the laser may be blocked.

If one analyzes the problem of endpoint determination in depth, as the present inventor has done, and looks at a robot in its deflected shape, it will be seen that what is needed is a straight line from joint to joint in each link, and the angles between the lines between various joints. The ultimate goal is to be able to sense changes in the effective length of that straight line (i.e., changes in the distances between joints) as the robot linkage is stressed and to sense changes in the angles between straight lines by virtue of intentional movements effected by the motors and changes in loading; in addition, twist of the load-bearing members must be sensed with accuracy.

The first thought is to use lasers with mirrors in the joints. Thus, lasers would beam through hollow robots arms and determine precise endpoint location. The problem is to design the linkages and control electronics to operate the mirrors that bend the laser, and then implement a microprocessor to count laser fringes to determine beam length and angle. This solution would give a good answer, but the system would be complex, which leads to stack-up errors, costly, frequency response limited, lack ruggedness and be difficult to maintain.

Figures 2A, 2B, 2C:
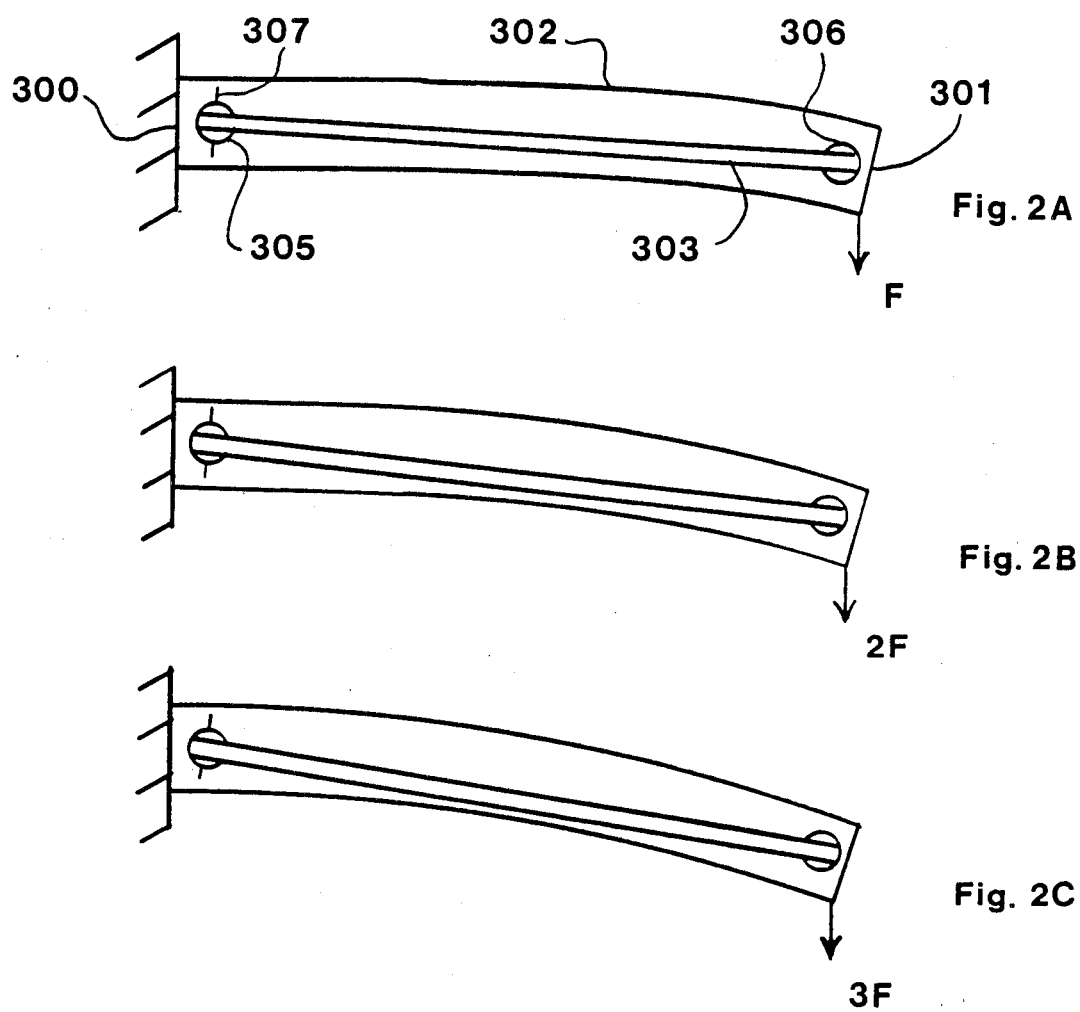

The present inventor's solution is shown schematically in FIGS. 2A, 2B and 2C which show a single arm or structural beam 302 of what usually will be a multi-arm robot. The arm, at the anchor end 300 thereof, is supported by a torque motor and can be modeled as being held by a rigid wall. Its free end 301 is shown loaded by a force F. Each arm (in a multiarm system), as later explained and as to the preferred embodiment, is hollw and each joint has an angular measuring device (such as an optical encoder) 305 and 306. A secondary or measuring beam 303 is disposed from joint to joint on the inside of the main structural beam 302. The measuring beam 303, as later explained in detail, is employed in measurement of distance between endpoints of the structural beam 302 and angles between the structural beam and the measuring beam; it is pinned at each end at a known point in the vicinity of the respective joint axis of the structural beam such that any deflection of the structural beam does not impose any loads on the measuring beam. One end of the measuring beam 303, as later discussed, is free to slide (i.e., translate) in and out of a socket on the angular measuring device 305 to allow for changes in length of the structural beam. Distance between the two ends 300 and 301 is determined by a linear measuring device 307 such as an LVDT, a capacitance probe, or an optical sensor which senses the amount of slide of the measuring beam. Thus, as the outer structural beam 302 bends, the inner measuring beam 303 remains straight because no bending moments can be applied to it since its ends are free to rotate; and one end of the measuring beam, as above noted, is free to translate (i.e., slide in its axial direction). FIGS. 2A–2C show the beam 302 during several stages of bending under loads F, 2F, and 3F. It is shown elsewhere herein that the measuring beam 303 is pinned at each end at a known point in the vicinity of the respective joints axis of the strucutal beam 302. As the structural beam bends under loading, the distance between pinning points changes and the free end of the measuring beam slides to accommodate the change, the change in distance being measured by a linear measuring device. Thus, the measuring beam lies along the straight line distance between the pinning points, being pinned at one end to the end of the associated structural beam and at the other end thereof to the same axis that pins the structural beam to the anchor. An angular measuring device is disposed at each joint axis of attachment of the measuring beam. One such angular measuring device measures the angle between a reference line at the anchor and the line from the axis of rotation of the structural beam to the endpoints of the structural beam. For joints which travel in a cartesian system, an extendable measuring beam with large length changing capacity would be used, i.e., one whose operative length changes more than the few percent required for sensing bending. For all conceivable robot designs, the same principle applies: the position of an outer load-carrying beam is determined by means of an inner measuring beam.

With regard to the deflection of the inner beam 303 under its own weight, one need only realize the following. The beam 303 is supported at two ends, verse the cantilever situation of the load-carrying beam 302; so the deflection of the beam 303 under its own weight is now one-tenth that if it were cantilevered. But more importantly, the slope (angle of sag) at the end is now one-fourth that of a cantilever beam of the same length. Also, since the beam 303 never has to carry any external loads, the error in slope will be predictable and repeatable; so the error can be stored in a calibration library and taken into consideration when the end-point position of the structural beam 302 is calculated.

Further, advantage can be taken of high stiffness/weight ratio composite materials, which are too expensive to be used to build an entire robot but could be used in this limited application, to minimize the amount of deflection of the measuring beam 303 under its own weight. In view of the foregoing explanation, the impact of the present solution should now be clear: using existing technology and angular measurement devices already in use on robots, with additions of simple brackets and measurement beams, instantaneous endpoint location can be determined. And, it will allow lightweight robots with very long reaches and high payloads and accuracies to be built. Long-reach robots will be particularly valuable, for instance, to the shipbuilding industry, for automating the welding process of very large ships. There now follows a brief review of theory underlying the present concepts.

Small, compact angular measurement devices have recently become available, which have ±1 arc second accuracy over a 360 angular-degree range of motion. For a ten-foot-long beam this leads to a maximum endpoint error of 0.0006". The other source of error is the angle (caused by the beam sagging under its own weight) at the ends of the measurement beam, where they are connected to the resolvers.

For a robot with a ten-foot reach and a 300-pound payload which is accelerated at one g. (32 ft./sec.$^2$) a fairly large cross-section is required to support the load. But it will be noted that here in the present system the structural beam is designed for the maxiumum stress condition, not minimum deflection, so the beam will be much lighter.

To satisfy a maximum stress criteria, let it be assumed that a uniform cross-section aluminum rectangular box beam ten feet long is to be used to support 300 pounds with a maximum design stress of 5,000 psi. The stress condition is:

$$\left(\frac{I}{C_{required}}\right) = \frac{(300 \text{ lbs.}) (120 \text{ in.})}{(5,000 \text{ lbs./in.}^2)}$$

$$= 7.2 \text{ in.}^3$$

This is satisfied by a box beam seven inches high, four inches wide with a wall thickness of three-sixteenths inch. The moment of inertia of the beam is 26 in.$^4$ The maximum deflection of this beam is:

$$\delta_{max} = \frac{(300 \text{ lbs.}) (120 \text{ in.})^3}{(26 \text{ in.}^4) (3 \times 10 \times 10^6 \text{ lbs./in.}^2)}$$

$$= 0.665 \text{ inches}$$

Total weight of the beam would be forty-five pounds. If one designed a ten-foot long cantilever aluminum beam to have only 0.020" deflection with an endload of 300 pounds, neglecting its own weight, the required moment of inertia would be:

$$I_{required} = \frac{(300 \text{ lbs.}) (120 \text{ in.})^3}{3 \times 10 \times 10^6 \text{ lbs./in.}^2 \times (.020 \text{ in.})}$$

$$= 864 \text{ in.}^4$$

and the beam would weigh in excess of two hundred pounds; it would have dimensions twenty inches high, eight inches wide with a wall thickness of five-sixteenths inch.

Working within a combined space of three inches by two and one-half inches, one can now investigate the properties of the measuring beam. An "I" beam shape is assumed with much of the material removed along the neutral axis (between the top and bottom flanges) of the beam. The beam 303 of FIG. 2 is to be made of advanced graphite epoxy composite materials, with a density of 100 lbs./ft.$^3$ and a flexural modulus (E) of $30 \times 10^6$ lbs./in.$^2$ (compared to steel whose density=490 lbs./ft.$^3$ and E=$29.6 \times 10^6$ lbs./in.$^2$).

For a two-inch beam with two-inch wide flanges 0.06 inch thick, the moment of inertia, I, equals 0.24 in.$^4$, and its weight per inch of length equals 0.058 lbs./in. Assuming a sixty-inch-long beam simply supported at its ends, the deflection in the middle, and the slope at the ends is:

$$\delta = \frac{(.058) (5) (60)^4}{(30 \times 10^6) (.24) (384)}$$

$$= .0014 \text{ in.}$$

$$\alpha = 7.3 \times 10^{-5} \text{ radians}$$

The angular errors at the two ends will add so the end-point error $\epsilon$ becomes, $$\epsilon = (2) (7.3 \times 10^5) (60 \text{ in.})$$

$$= .00087 \text{ in.}$$

This error can be reduced by two orders of magnitude by using a software correction to compensate for the predictable angle of sag $\alpha$.

Since the beam 303 (as just described) is perfectly symmetrical, simply supported, and its weight and angle of inclination with respect to gravity are known, the error in slope that the angular measuring devices (later described) sense, due to the beam sagging, can be compensated. On the other hand, the structural beam 302 has complex joints, and unknown loading histories; so it would be virtually impossible to predict its deflected shape and to accurately account for it with a software correction.

Figure 4:
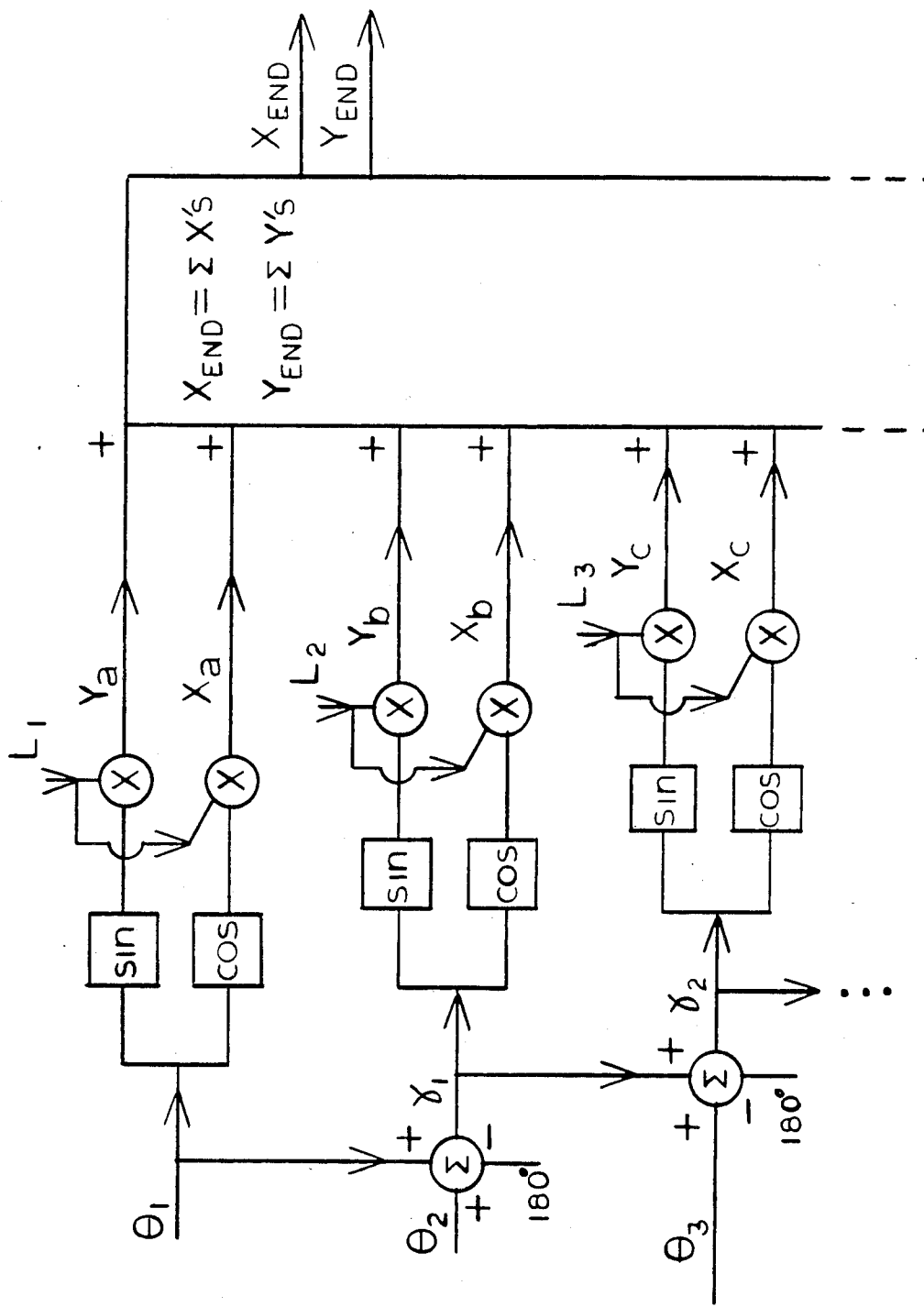
FIG. 4 shows part of the detailed algorithm to compute the endpoint position of the links in FIG. 3, given the information of FIG. 3.
Figure 5:
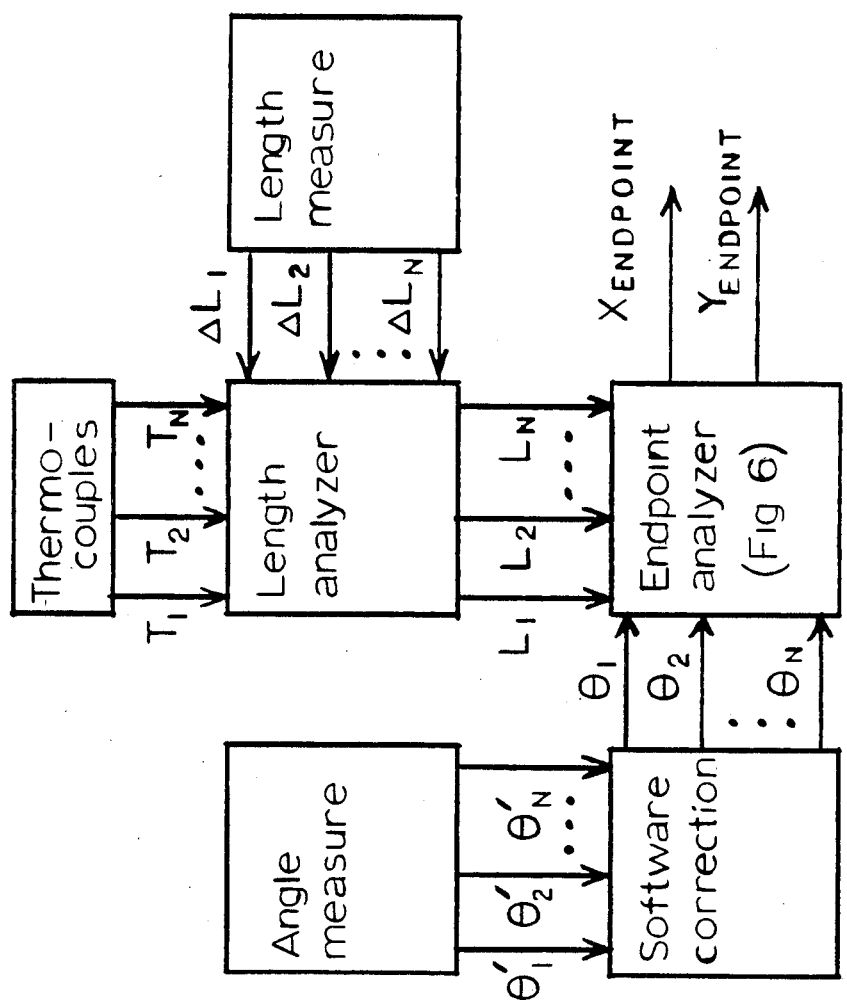
FIG. 5 shows a detailed block diagram of the computer run positioning algorithm which determines the true endpoint position of the robot, independent of load, temperature, etc.

FIG. 3 shows a simple series of extendable links $L_1 \ldots L_4$. For this type of system, it is assumed that the links and system loads remain in the XY plane. A block diagram of the system algorithm to determine endpoint position is shown in detail in FIG. 4 and schematically in FIG. 5. The software correction that compensates for the measuring beams sagging under their own weight and changing length due to thermal and other effects are shown in FIG. 5, but are not shown in FIG. 4. The showings in FIGS. 3, 4, and 5 are self-explanatory to workers in this art and are extendable to a three-dimensional structure.

So far the discussion has covered the simple case of all beams and loads remaining in a two-dimensional plane. In reality, a robot such as the one shown in FIG. 6 will be used. This articulating robot can mimic the human arm and more. Unfortunately, due to its 3-D configuration, the beams not only bend but they twist due to loads which can be applied from any direction to the plate labeled 20 to which the gripper or other end effector is attached.

Figure 6:
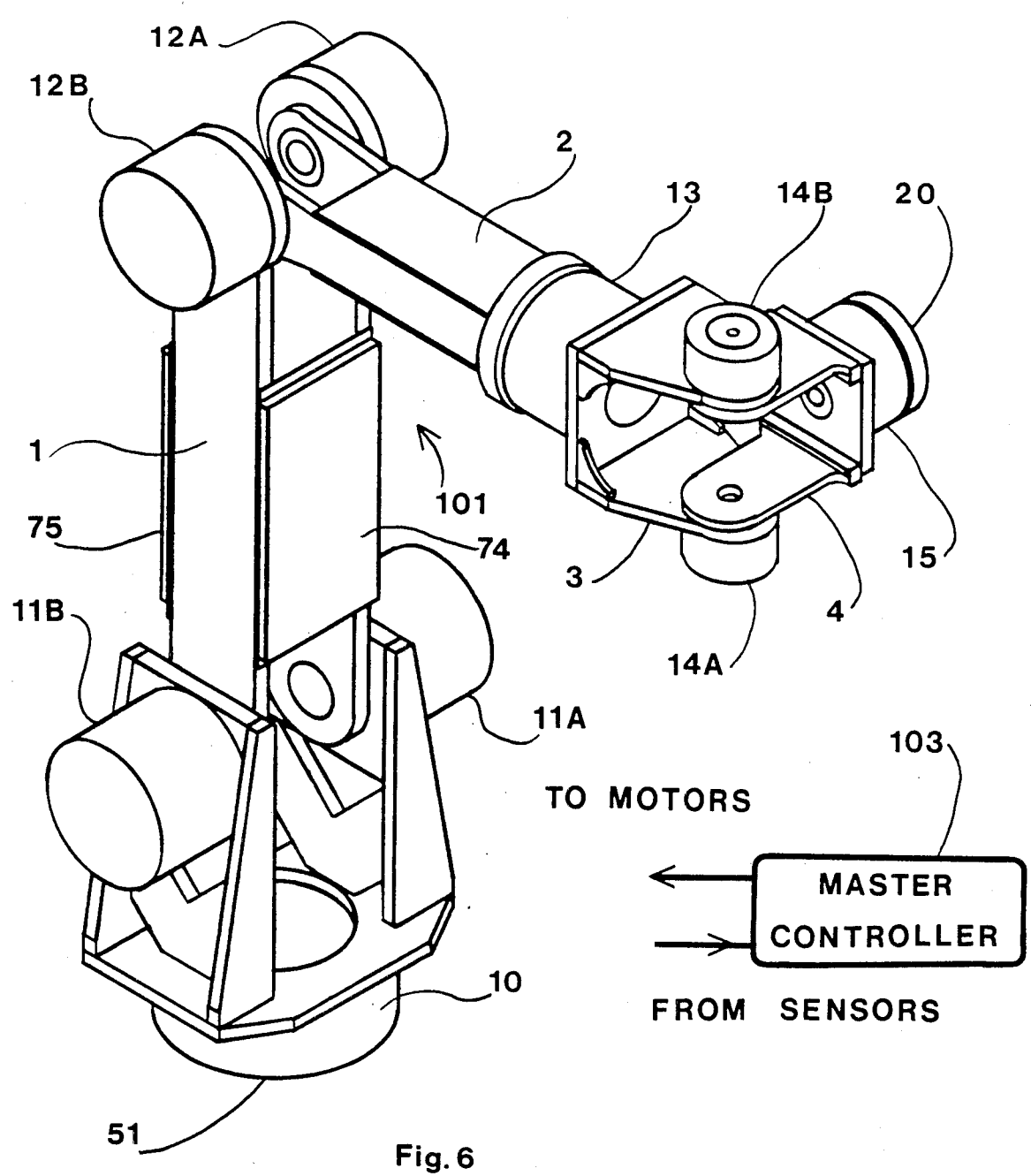
FIG. 6 is an isometric view of a possible configuration for a six degree of freedom robot with a payload-to-weight ration of 1:1.

The mechanism labeled 101 in FIG. 6 is a robot whose outer structural hull only is shown. The hull consists of structural beams or links 1, 2, 3, and 4 whose movement is effected by torque inputs from the motors 10, 11A, 11B, 12A, 12B, 13, 14A, 14B, and 15 under control of a master controller 103. For maximum power/weight ratios, hydraulic vane actuators can be used. For maximum controllability, electric motors can be used. The hull with hydraulic vane actuators is designed to have a payload-to-weight ratio of 1:1. Since in the mechanism 101 it is easy to sense deflection by using the guidance system 102 shown in FIGS. 7 and 9, design emphasis is placed on maximizing the strength/weight ratio. (Weight reduction and beam connection methods are within the skill of the art as evidenced by aircraft design techniques, particularly the landing gear systems.) It will be appreciated that the guidance system 102 in the mechanism 101 need be supported only in the vicinity of the joints; hence the axis of rotation of any angular measuring devices associated with the joints does not need to exactly coincide with the axis of rotation of the structural joints. It will be noted that because the guidance system senses all motions of the robot, low-precision, stress-designed motors can be used to move the various load-heavy structural elements, thereby reducing weight and cost of the motors as well as overall manufacturing costs. It will also be noted that the key to the guidance system is to locate a first point (e.g., the location at which an end effector would be attached, marked 20 in FIG. 7) with respect to some other point (e.g., the location of the base marked 51 in FIG. 7). To accomplish that purpose it is necessary to know the coordinates of the first point and three other unique position (linear and/or angular) measurements, i.e., the X, Y, Z coordinates of the second point or two angles and distance between the points (i.e., cartesian, cylindrical or spherical coordinate information). The structures 74 and 75 in FIGS. 6-8 are fiber sandwich supports to take primarily bending forces on the beam 1.

Figure 7:
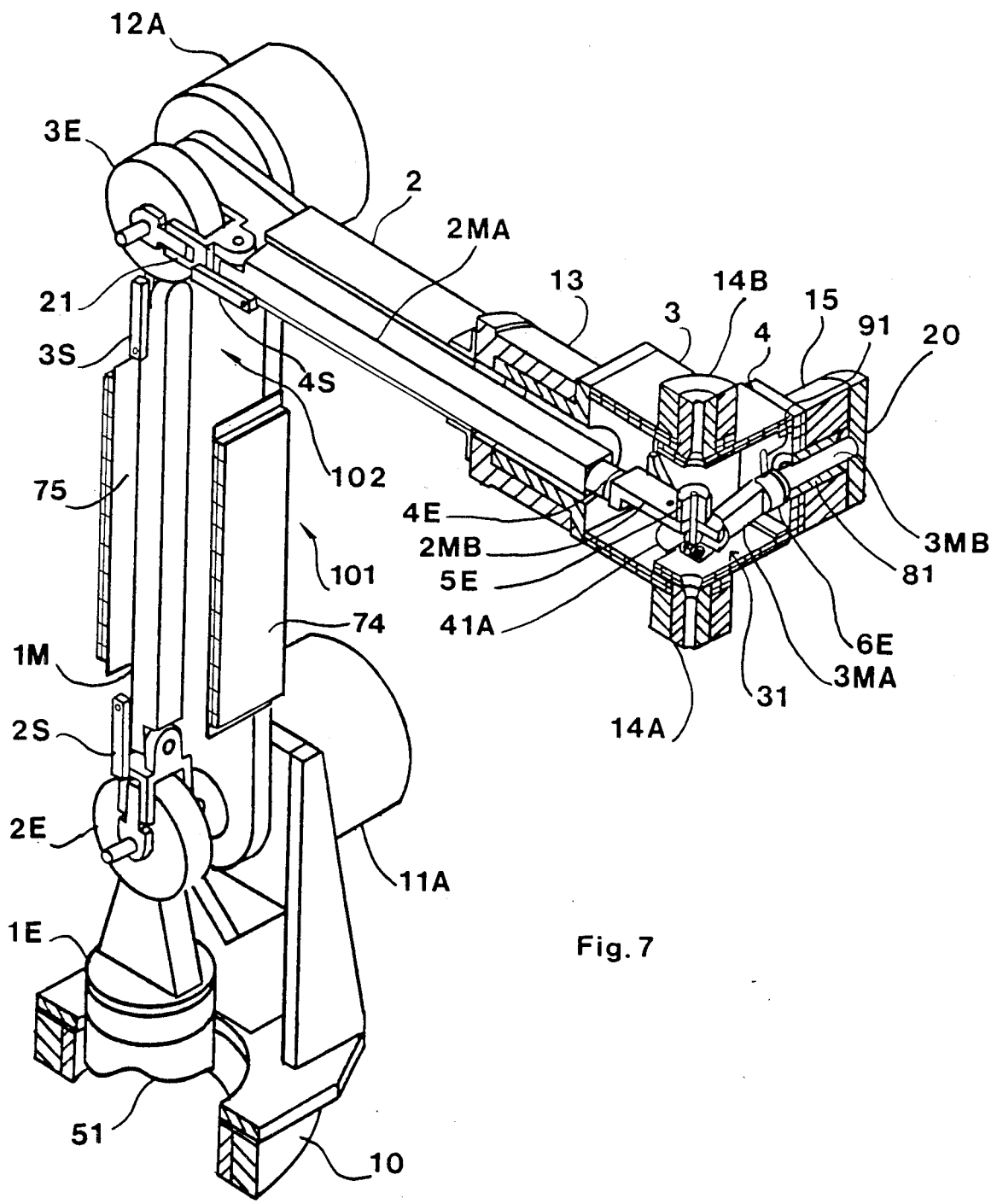
FIG. 7 is a cutaway isometric, that shows an inner system of measuring beams and linear and angular measuring devices contained within a series of articulating structural beams whose position is controlled by hydraulic vane actuators, that mimic a fully double-jointed human arm and wrist.
Figure 9:
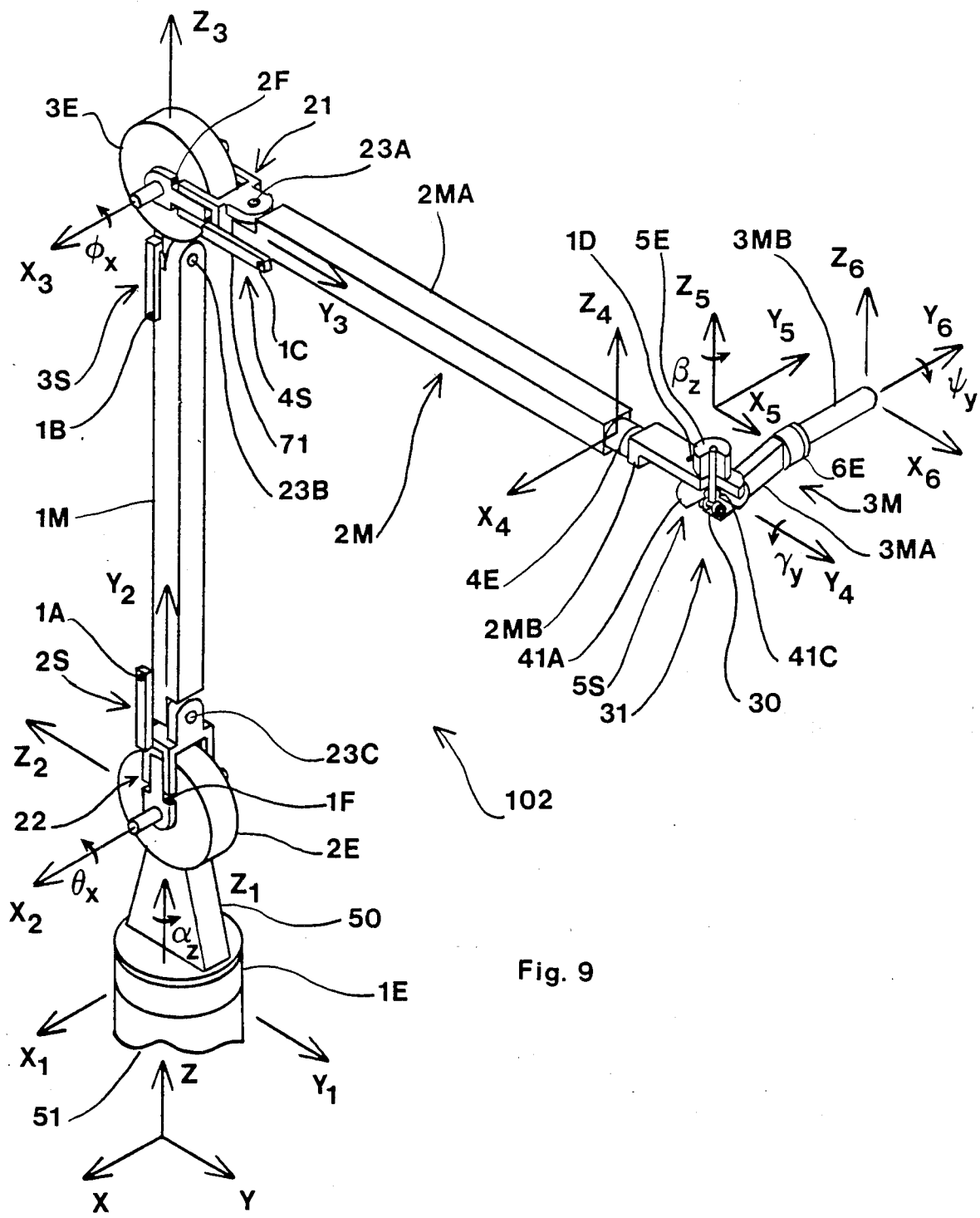
FIG. 9 is an isometric view that shows only the inner measuring beams and linear and angular measuring devices.

In the present system, the gripper location is found from the relative positions of intermediate coordinate systems located at each degree of freedom (i.e., in the vicinity of each joint location) which are found from information supplied by the guidance system 102 shown in FIGS. 7 and 9. At each joint (intermediate coordinate system) position, velocity and acceleration vector transformations are calculated. The velocity and acceleration values are obtained from first- and second-time derivatives of the position vectors, respectively. This information is used by the master controller 103, shown schematically in FIG. 6, to calculate the position and trajectory of the robot, and use this information to determine the torque input to each joint of each respective motor. Details of the controller design are known to those skilled in the art.

Figure 8:
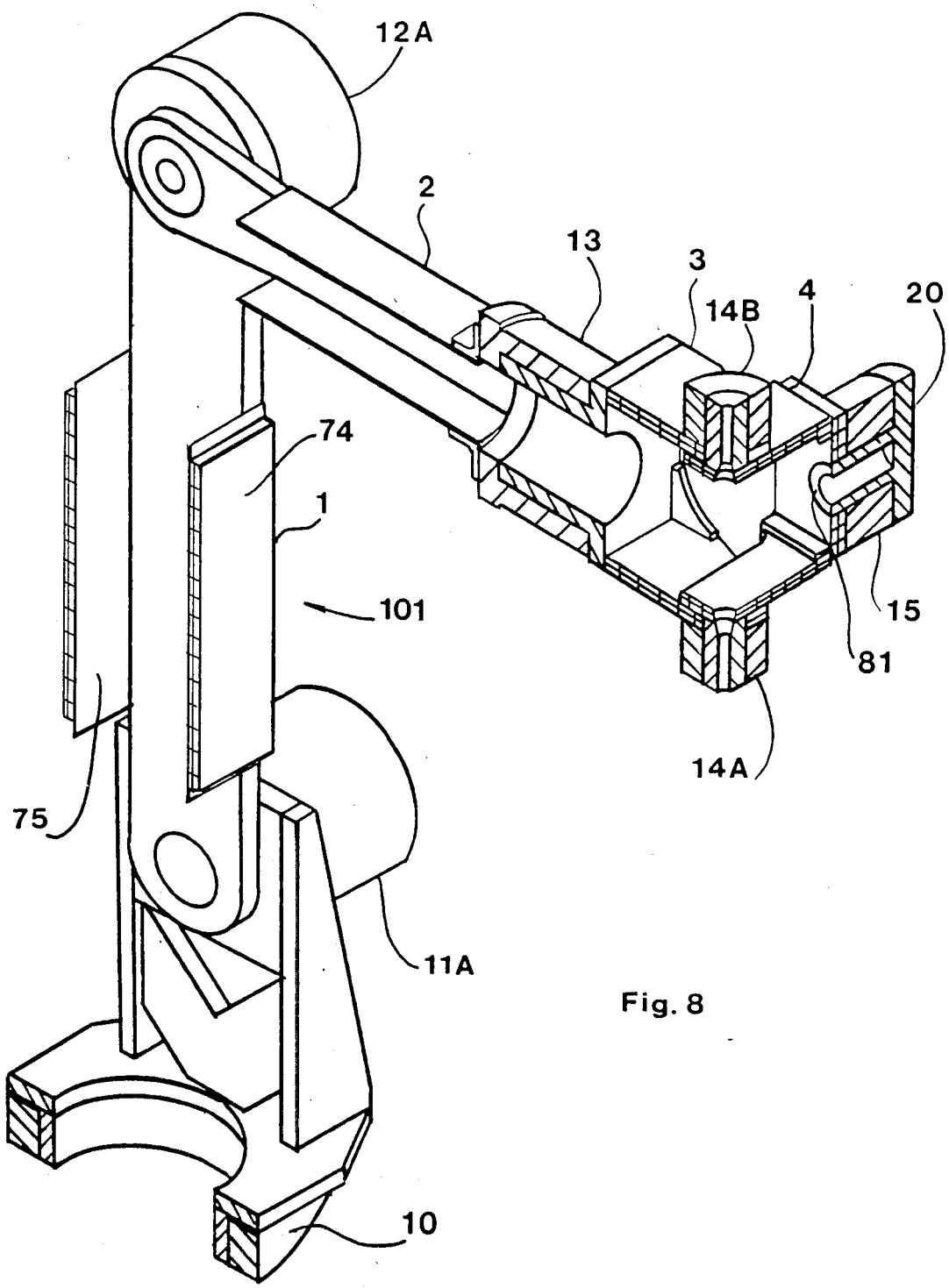
FIG. 8 is a cutaway isometric view that shows the right half only of the structural beams and the torque motors that control their motion.

The major components locations that make up the guidance system 102 are described below and are shown in FIGS. 8 and 9.

In FIG. 9 there is shown interior mechanism 102 of the robot 101 in FIG. 6, including inner measuring beams 1M, 2M and 3M; as above mentioned, each of the measuring beams 1M, 2M, and 3M is pinned at a known point in the vicinity of the respective joint axis (e.g., usually—but not necessarily—within a hollow structural beam) of the assembled structural beams 1, 2, 3, and 4, respectively, such that any deflection or motion of the associated structural beam does not impose any loads on the measuring beam. It will be noted that the structural beams 2 and 3 are always co-linear but they can rotate with respect to one another. In the context of this specification the beams 2 and 3 can be thought of as being a single two-component structural beam with a single measuring beam 2M, the latter consisting of measuring beam components 2MA and 2MB, pinning of the structural beam 2M at one end being in the vicinity of the joint between the beams 1 and 2 and at the other end in the vicinity of the joint between beams 3 and 4. The components 2MA and 2MB are connected by encoder 4E. The measuring beam 3M is a component consisting of measuring beam components 3MA and 3MB connected by encoder 6E. Three types of measurements are made. Each large-scale measurement representing each controllable degree of freedom is made by an angular measuring device in the form of the encoders 1E, 2E, 3E, 4E, 5E, and 6E disposed at each joint axis (i.e., at each joint at which angular movement occurs by virtue of motor driven forces). Each degree of freedom at a joint is controlled by the torque input from motors 10, 11A, 11B, 12A, 12B, 13, 14A, 14B, and 15 corresponding to each joint shown in FIGS. 6 and 8, as earlier noted.

Figure 10:
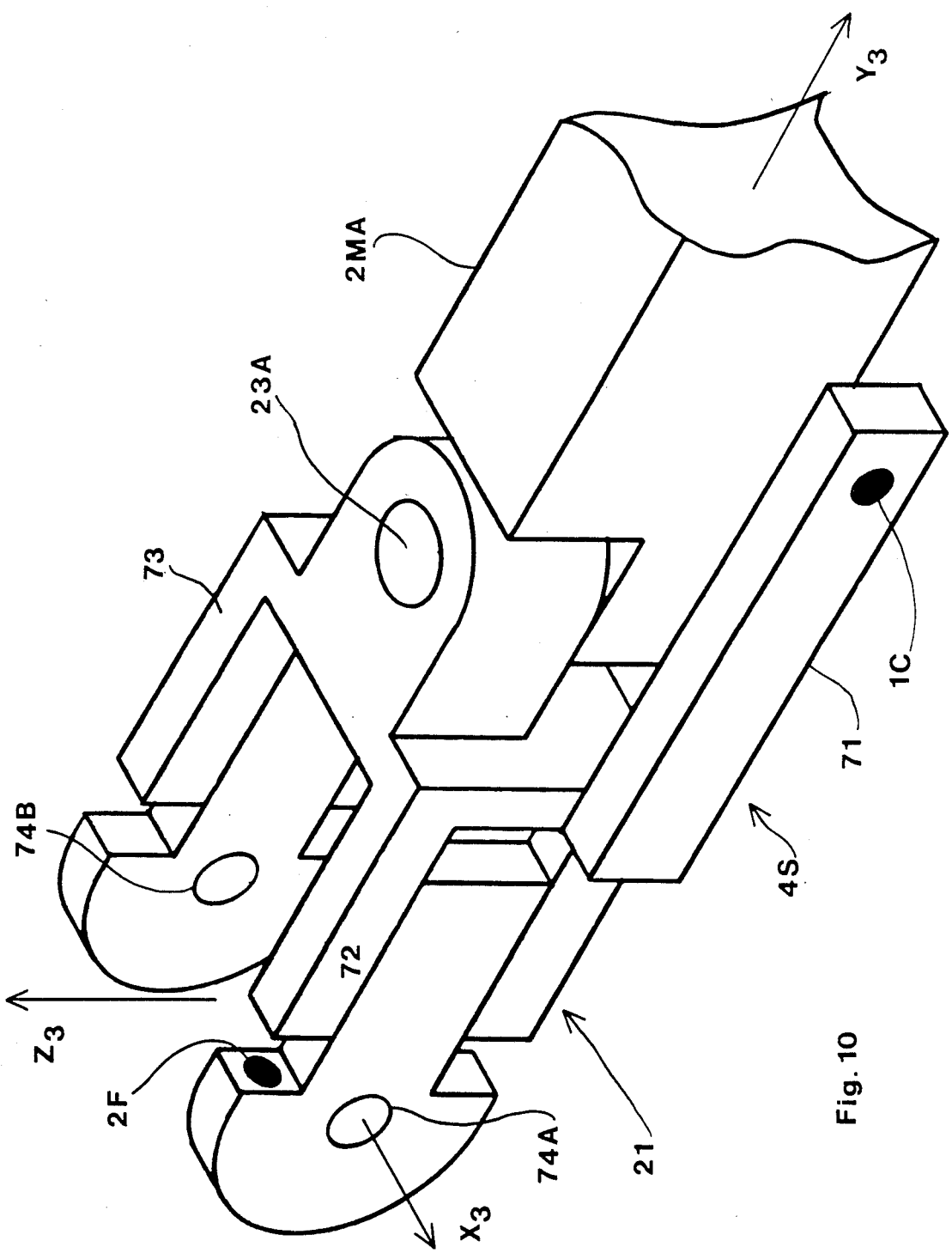
FIG. 10 is an isometric view of one of the brackets that connects a measuring beam to an encoder while giving the measuring beam two rotational degrees of freedom and one sliding measurable degree of freedom.
Figure 11A:
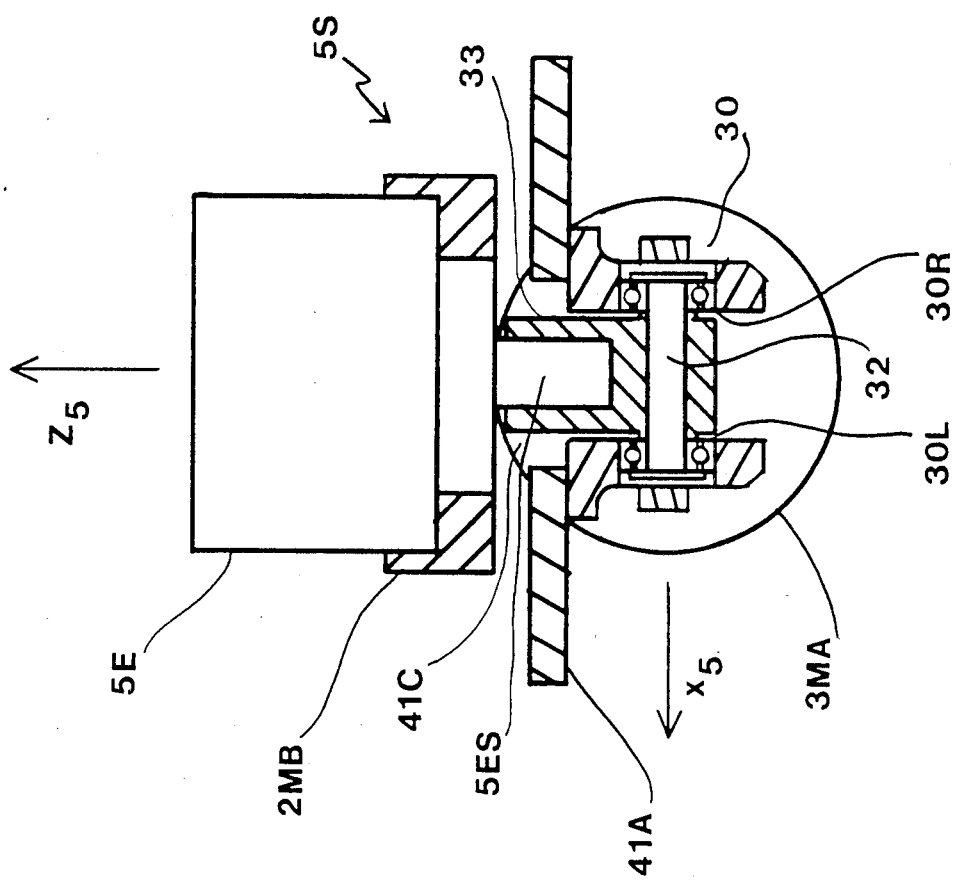
FIGS. 11A and 11B are respectively cutaway side and rear views of a floating measuring beam joint mechanism that is used near the wrist of the robot.
Figure 11B:
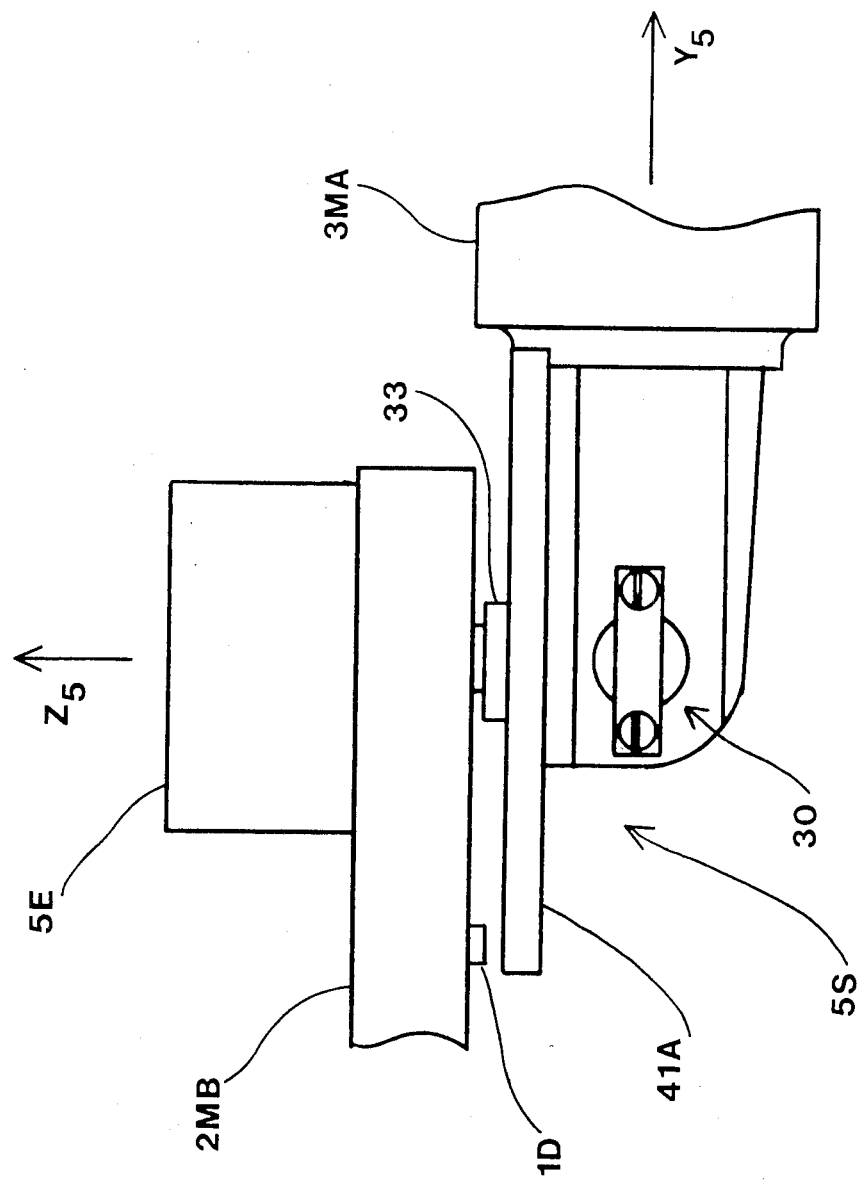

Small angular measurements at the joint axes which sense deflections due to loading of the structural beams in the x directions are measured by devices 2S, 3S, 4S, and 5S. The device 4S which is typical is shown in FIG. 10, and 5S is shown in FIGS. 11A and 11B. All incorporate a small linear measuring device 1A, 1B, 1C, and 1D (FIG. 10), respectively, which measures the change in gap between a stationary surface such as 71 (FIG. 10) and a surface of the measuring beam such as 2MA which rotates about a pin such as 23A with respect to it. From this, the angle between the two surfaces is determined, changes in the angle being used to provide information from which pivoting or twisting movement can be determined.

Linear measuring devices 1F and 2F detect operative length changes in the measuring beams 1M and 2M which are free to slide along slides 22 and 21, respectively, as above noted. The slide 21 is shown in isometric view in FIG. 10. As shown schematically in FIG. 10, the device 2F is an optical sensor or capacitance probe which measures the gap between itself and the sliding rail 72. The encoder 3E would fit between the two rails 72 and 73 and its shaft would fit in the holes 74A and 74B; but it is not shown here for clarity. This satisfies the criteria that the measuring beams must be pinned at each end, but one end thereof must be free to slide (translate) along its longitudinal axis to insure that no loads are imposed on the measuring beams as the structural beams deflect. It will be noted that for a three-dimensional case, a structural beam can bend in two directions, vertically and horizontally, as well as twist about its longitudinal axis. Thus, each measuring beam must be effectively pinned about three orthogonal axes at one end, two orthogonal axes at the other, and be able to change its length. The mechanism and the measuring devices which accomplish these actions are further described below, but first the coordinate systems that describe the motions of the robot are explained.

In the explanation that now follows with reference to FIG. 9, the designation XYZ is a fixed global coordinate system in which the coordinates of the base 51 of the guidance system are known and the endpoint coordinates of the gripper are to be calculated in the form of a series of transformations between coordinates systems $X_1, Y_1, Z_1 \ldots X_6, Y_6, Z_6$ (i.e., the coordinate systems one . . . six, respectively), as now explained and shown in FIG. 9. The rotations $\delta$, $\theta$, $\phi$, $\gamma$, $\beta$, and $\psi$ are associated with rotations in the $X_1, Y_1, Z_1 \ldots X_6, Y_6, Z_6$ coordinate systems, respectively; a subscript on the rotation indicates about which axis the rotation occurs. The right hand rule applies for defining positive and negative rotations.

Axis $Z_1$, of the coordinate system $X_1, Y_1, Z_1$ (i.e., the coordinate system one herein), lies along the axis of the encoder 1E, which is also approximately the axis of the motor 10 in FIG. 6. The rotation $\alpha_z$ of the entire robot about the $Z_1$ axis equals the rotation of the encoder 1E, the origin being at the center of the encoder 1E. The coordinate system one rotates through the angle $\alpha_z$, which is controlled by the torque input from the base motor 10 (FIG. 6).

Axis $X_2$, of the coordinate system $X_2Y_2Z_2$ (i.e., the coordinate system two), lies along the axis of the encoder 2E, which is also approximately the axis of the motors 11A and 11B in FIG. 6. The $Y_2$ axis always points in the direction of the coordinate system three. The coordinate system two rotates by the angle $\theta_x$, measured by the encoder 2E, which is controlled by the torque input from motors 11A and 11B in FIG. 6.

Axis $X_3$, of the coordinate system $X_3Y_3Z_3$ (i.e., the coordinate system three) lies along the axis of the encoder 3E, which is also approximately the axis of the motors 12A and 12B in FIG. 6. The $Y_3$ axis, lies in the plane of the neutral axis of the measuring beam 2M, and thus always points toward the coordinate system four. The origin is at the center of the encoder 3E. The coordinate system three rotates by the angle $\phi_x$, measured by the encoder 3E, which is controlled by the torque input from motors 12A and 12B in FIG. 6.

Axis $Y_4$, of the coordinate systems $X_4Y_4Z_4$ (i.e., the coordinate system four), lies along the axis of the encoder 4E, which is also approximately the axis of the motor 13 in FIG. 6. It always points toward the encoder 5E. The origin is at the center of the encoder 4E. The coordinate system four rotates by the angle $\gamma_y$, measured by the encoder 4E, which is controlled by the torque infrom from the motor 13 of FIG. 6.

Axis $Z_5$, of the coordinate system $X_5Y_5Z_5$ (i.e., the coordinate system five), lies along the axis of the encoder 5E, which is also approximately the axis of the motors 14A and 14B in FIG. 6. The axis $Z_5$ is always parallel to the axis $Z_4$. The axis $Y_5$ points in the same relative direction as axis $Y_6$. The origin lies at the center of the bearings 30. The coordinate system five rotates by the angle $\beta_z$, measured by the encoder 5E, which is controlled by the torque input from motors 14A and 14B of FIG. 6.

Axis $Y_6$, of the coordinate system $X_6Y_6Z_6$ (i.e., the coordinate system six), lies along the axis of rotation of the encoder 6E, which is approximately the axis of the motor 15 in FIG. 6. Its origin is at the center of the gripper plate 20. The initial positions of the $Z_6$ and $X_6$ axes are arbitrary. The coordinate system six rotates by the angle $\psi_y$, measured by the encoder 6E, which is controlled by the torque input from the motor 15 of FIG. 6.

The gripper plate 20 remains fixed with respect to the coordinate system six. A description of the systems now follows.

As indicated above, it will be noted that for each motor or pair of motors there coincides one encoder (e.g., the encoder 2E) whose axis of rotation roughly coincides with the axis of rotation of the motor(s) (e.g., the motors 11A and 11B). Starting with the gripper plate 20 (which is attached to the shaft 81 of the motor 15 in FIGS. 7 and 8 and the plate can be assumed to be rigid) and which is the plate to which a gripper or other end effector (drill, paint gun, welder, and so forth) is mounted, system locations are determined from information provided by a plurality of measuring devices and from the coordinate systems transformations.

The gripper plate 20 is fixed in the coordinate system $X_6Y_6Z_6$ (i.e., the coordinate system six). The position and orientation of the coordinate system six relative to the coordinate system five is determined by the length of the measuring beam 3M, the angle $\psi_y$ (which is the angle of rotation of the coordinate system six about the $Y_6$ axis), and the small angle $\beta_x$.

The first step in determining the angle $\psi_y$ is to rigidly connect the measuring beam 3M to the gripper plate. (Even if the beam is not precisely perpendicular to the plate, a software correcton can take that into consideration.) The measuring beam 3M includes the measuring beam component 3MA which follows all motions of the measuring plate 20, and the measuring beam component 3MB which follows all motions except the rotation angles $\psi_y$. The rotation angle $\psi_y$ is controlled by torque input from motor 15. The measuring beam component 3MA, as above noted, is connected to the measuring beam component 3MB by the encoder 6E. An imaginary line can always be drawn colinear with the axis of the encoder 6E back to the $Z_5$ axis or $Z_5 X_5$ plane indicates the position of the encoder 6E with respect to the coordinate system 5. Thus, the encoder 6E provides information with respect to the rotation angle $\psi_y$ of the gripper plate 20 (i.e., the rotation $\psi_y$ of the coordinate system six about its $Y_6$ axis).

The measuring beam component 3MA extends back to a point which roughly lies along the axis of rotation of the motors 14A and 14B. Torque input from the motors 14A and 14B control the angle $\beta_z$ of the coordinate system five about the $Z_5$ axis, which is measured by the encoder 5E. The encoder 5E connects the measuring beam component 2MB and the measuring beam component 3MA, the joint assembly 31 therebetween being free-floating. Support for the joint 31 is given by the measuring beam 3 which is rigidly attached to the gripper plate 20. Since the measuring beam 3M is short (typically ten inches), it will easily support the weight of the joint 31 with a reproducible and predictable deflection that is dependent only on the position of the robot in space. By using high stiffness materials, the consequence of that deflection can usually be obviated.

The encoder 5E and the small angular measuring device 5S provide information with respect to the position of the coordinate system six relative to the coordinate system five. As the structural link 4 deflects in the minus $Z_5$ direction under load for the position shown, the gripper plate 20 experiences a small rotation about the $X_5$ axis. This causes a small displacement of the encoder 5E in the $Z_5$ direction which is allowed because the joint 31 (which is located in the coordinate system five) is free-floating with respect to the motors 14A and 14B. (The joint 31 is supported by the measuring beam 3M in FIG. 9 through the gripper plate 20. A small deflection in the positive $Z_5$ direction of one end of the measuring beam 2M for the position shown would cause a small angular change $\phi_x$ about the $X_3$ axis which is read by the encoder 3E, and a small angular change $\beta_x$ about the $X_5$ axis which is read by small angular measuring device 5S. At the joint 31 which is shown in detail in FIGS. 11A and 11B, let it be assumed that the motors 14A and 14B bring the structural beam 4 into a position such that it is colinear with structural beam 3, but rotated by the motor 13 90 degrees, so the axes of the motors 14A and 14B are parallel to the axes of motors 12A and 12B, then deflections of the structural beam 4 in the $X_5$ direction will be sensed by a change in angle about the $Z_5$ axis measured by the encoder 5E. Deflections between these two extremes are represented by a simple geometric combination of the rotations about the $Z_5$ and $X_5$ axes which would be obvious to one skilled in the art. Thus, individual or simultaneous deflection in the $Z_5$ and $X_5$ directions are measured by rotations about the $X_5$ and $Z_5$ directions, respectively.

The device 5S is shown in detail in FIGS. 11A and 11B and consists of a disk 41A, the measuring beam 2MB, an optical sensor or capacitance probe 1D, and a bearing assembly 30. The disk 41A has a center hole 41C, about one-half inch larger than the shaft marked 5ES of the encoder 5E; the shaft 5ES passes through the center hole in the disk 41A and is attached to the center of an axle 32 by a yoke 33 that is held by precision bearings 30L and 30R whose mutual axis of rotation is parallel to the direction $X_5$. Thus, as the structural beam 4 undergoes a deflection in the $Z_5$ direction, the measuring beam 3M experiences a slight rotation $\beta_x$. This in turn causes the disk 41A to no longer be parallel to the measuring beam 2MB. It is necessary to use a disk, in order that the angle $\beta_x$ can be continuously measured, as the coordinate system five can rotate about its $Z_5$ axis through the angle $\beta_z$.

The change from parallel is detected by measuring the gap between the disk 41A and the measuring beam 2MB with an optical sensor or capacitance probe 1D. (For example, the optical sensor 1D can be one of a number of light emitting devices and detector combinations available in various frequency bands, such combinations being secured to the measuring beam 2MB to irradiate the surface of the disk 41A; when the two are parallel maximum reflected light is received by the detector and calibration gives degree of nonparallel positioning between the two; or fiber optics can be used. Any suitable linear measuring device may be used.) From the informaton thereby obtained, the angle $\beta_x$ can be calculated. With the known angle $\beta_x$, the fixed distance between the coordinate systems five and six, and the fact that the axis $Y_6$ must lie along the measuring beam 3M (whose projection onto the $X_5Y_5$ plane lies along the $Y_5$ axis), the position and orientation of the coordinate system $X_6Y_6Z_6$ with respect to the coordinate system $X_5Y_5Z_5$ is uniquely known. It will be noted that to prevent measuring beam 2MB from rotating on its own, when 3MB and 2MB are colinear, a post 91 shown in FIG. 7 is added to allow the floating joint 31 all degrees of freedom relative to the structural beam 4 except for rotations about the $Y_5$ axis. The post 91 and the beam 3MA will rotate about the $Y_5$ axis only as the structural beam 4 does when it is colinear with structural beam 3. It should be noted that the rotation $\gamma_y$ between structural links 2 and 3 controlled by torque input from the motor 13 is measured by the encoder 4E.

Next, the position of the coordinate system five with respect to the coordinate system four is determined. The distance between the centers of $X_4Y_4Z_4$ and $X_5Y_5Z_5$ is fixed by the length of the measuring beam component 2MB. The axes $Z_4$ and $Z_5$ are always parallel. The rotation $\beta_z$ of the coordinate system $X_5Y_5Z_5$ about its $Z_5$ axis is measured by the encoder 5E and controlled by the torque input from motors 14A and 14B. Thus, two angles are known. The axis $Z_4$ parallel to the axis $Z_5$ and $\beta_z$, and one length 2MB (which remains along the $Y_4$ axis), which uniquely determines the position and orientation of the coordinate system $X_5Y_5Z_5$ with respect to the coordinate system $X_4Y_4Z_4$.

The location of coordinate system four with respect to the coordinate system three is found by determining the length and orientation of the line that extends from the center of the encoder 3E, origin of coordinate system 3, to the center of the encoder 4E. This line changes length as the structural beams 2 and 3 (FIG. 6) deflect. This change in length is accommodated by the slide mechanism 21 shown in FIG. 9 and in detail in FIG. 10. The optical sensor or capacitance probe 2F measures the amount of slide. This along with the known length of the measuring beam component 2MA gives the distance between the encoders 3E and 4E. It will be noted that the $Y_4$ axis always lies along the measuring beam 2M and the $Z_4$ axis is always parallel to the $Z_5$ axis. The orientation of the $X_4$ and $Y_4$ axes with respect to the coordinate system three are determined by the angle $\phi_z$ in the coordinate system three which is measured by small angular measuring device 4S. As shown in detail in FIG. 10, the device 4S has a beam 71 attached to the slide 21 and extends along, but at a distance, from the measuring beam component 2MA. The measuring beam component 2MA is attached to the slide 21 by a pin 23A which allows the measuring beam to pivot about an axis parallel to the $Z_3$ axis. Thus, deflections of the structural beam 2 in FIG. 6 in the $X_3$ direction cause the measuring beam 2M to pivot about the pin 23A. The distance between the beam 71 and the beam component 2MA changes and is measured by the optical sensor 1C. This allows the angle $\phi_z$ to be determined. The slide mechanism 21 also ensures that the measuring beam 2M is always in the same plane as the axis $Y_3$. Thus the axes $Y_4$ and $Y_3$ always lie in the same plane.

In summary, the angle measured by the small angular measuring device 4S, the $Y_4$ and $Y_3$ axes being coplanar and the length 2MA being found from its initial set length plus the amount measured by the linear measuring device 2F, uniquely define the length and orientation of the line from the origin of the coordinate system three to the origin of the coordinate system four. Orientation of the coordinate system four about this line is known since the axis $Y_4$ is parallel to and lies along this line, and orientation of the $Z_4$ and $X_4$ axes about the line are measured by the encoder 4E, which measures the angle $\gamma_y$.

It is important to understand that all this allowed freedom of motion permits the joint 31 to be free-floating which allows any eccentricity associated with non-alignment of the measuring beam 3M with the axis of rotation of the motor 15 to cause the encoder 5E and, hence, the end of measuring beam 2M to trace out a circle or sphere in space, thus minimizing the amount of sensors needed to sense deflections and large motions about any three axes of structural beams 2, 3, and 4. Also, sideways deflections of the robot arm (in the direction $X_3$) will be sensed. Since the eccentricity and sideways deflections will be small, only small angular measuring devices 4S and 5S are needed to sense them. Other angular deflection components are sensed by the encoders 3E, 4E, and 5E which are needed anyway to measure large motions due to torque inputs from motors 12A, 12B, and 13, and 14A and 14B. Thus, the measuring beam 2M is pinned in two orthogonal directions at one end, i.e., the shaft of the encoder 3E and the pin 23A, and pinned about three orthogonal axes at the other end, i.e., the encoders' shafts 4E and 5E, and the bearings 30. The measuring beam 2M is also free to change its length by the device 21. For the robot in the position shown, the axes of the bearings 30 and the encoder 4E (see FIG. 9) are parallel. For this degenerate case, the encoder 6E acts as the third orthogonal axis. For intermediate angles, the encoder 6E and the bearing 30 share the responsibility. This joint design is extremely important in making the system simple, accurate, and reliable. The free-floating joint assembly 31 is a critical element because the wrist of the robot must be light weight and small.

The position and orientation of the coordinate system three with respect to the coordinate system two is determined by the position of the measuring beam 1M whose endpoint location with respect to the coordinate system two depends on the angles $\phi_x$, $\phi_y$, and $\theta_y$ and its initial length plus the change in length measured by the linear measure device 1F. The $\theta_y$ and $\phi_y$ components would be caused by a momemt created about the $X_2$ axis if a weight were held by an end effector attached to the plate 20 with the robot in the position shown. The slide mechanism 22 ensures that the measuring beam 1M always lies in the $X_2Y_2$ plane.

The angles $\theta_y$, $\phi_y$ are thus small and are determined by the small angular measuring devices 2S and 3S which operate in the same manner as the device 4S described above and shown in FIG. 10. It will be noted that the measuring beam 1M is pinned in two orthogonal directions at one end, i.e., the shaft of the encoder 3E and the pin 23B, and pinned about three orthogonal directions at the other end, i.e., the pin 23C, the shaft of the encoder 2E, and the shaft of the encoder 1E. The encoder 1E thus forms a turntable to which the whole guidance system is anchored. The length of the measuring beam 1M is allowed to change by a sliding mechanism 22 which is identical to sliding mechanism 21. The operative length change is sensed by an optical sensor 1F. The position of the origin of the coordinate system three with respect to the coordinate system two is now known.

The origin of the coordinate system two lies on the $Z_1$ axis a fixed distance from the $X_1Y_1Z_1$ origin equal to the length of the base beam 50. Its $X_2$ axis is always parallel to the $X_1$ axis. The orientation of the $Z_2$ and $Y_2$ axes are given by the angle $\theta_x$. This angle is controlled by torque input from motors 11A and 11B and is measured by the encoder 2E.

The origin of the coordinate system one is located at any desired global coordinate system point. The rotation $\alpha_z$ of the coordinate system one is measured by the encoder 1E and controlled by torque input from the motor 10 (FIG. 6).

This completes the description of the guidance system for a six degree of freedom robot. The position information supplied by the guidance system is used by the control algorithm to produce closed-loop control around the entire robot (not just each joint). These mathematical expressions are known to those skilled in the art. What has not been known is a way to efficiently and effectively measure the physical parameters, i.e., lengths and angles, necessary to implement a control algorithm for precise endpoint control of a robot or other linkage.

A few matters noted above are repeated here for emphasis. The term "operative length" applied to the measuring beam is used herein to denote the distance between the points that the particular measuring beam is pinned. That operative length changes as the associated structural beam bends under load or as the temperature changes. It will be appreciated, though, that the ultimate goal here is to determine the location of the end of the structural beam, that being established by locating positions of the pinning points. All measurements—linear and angular—are made relative to coordinate systems, which are related to the anchor coordinate system by coordinate system transformations, as the linkage pivots, rotates and twists with respect to the anchor or base end of the linkage; those measurements provide information from which exact endpoint location and orientation of a gripper or the like can be determined.

Further modifications of the invention herein disclosed will occur to persons skilled in the art and all such modifications are deemed to be within the scope of the invention as defined by the appended claims.

What is claimed is:

1. A mechanism to determine at least one of the exact endpoint location and orientation of a structural beam with respect to a reference coordinate system that includes a reference line, irrespective of loads applied to the structural beam, which loads subject the structural beam to small bending movement about transverse axes and twisting movement about its longitudinal axis, that comprises:

a structural beam for supporting a load at one end thereof, said structural beam being attached at the other end thereof to an anchor that serves as the reference coordinate system, which structural beam is pivotally connected to said anchor, changes in the linear distance between endpoints of said structural beam because of said bending as a function of loading due to deflections caused by said loading and twists due to torque forces caused by said loading about its longitudinal axis;

drive means connected to pivot the structural beam relative to the anchor;

a measuring beam associated with the structural beam, that is employed in measurement of the changes in the linear distance between endpoints of the structural beam by virtue of said bending movement and angular changes between the structural beam and the measuring beam by virtue of twisting and bending movements caused by said torque forces;

means to support the measuring beam at each end at a known point in the vicinity of a respective joint axis of the structural beam such that any deflections of the structural beam which are to be detected do not impose any loads on the measuring beam;

angular measuring means disposed at least at one joint axis of the measuring beam to measure any twist and slope difference angles between the central axis of the measuring beam and said other end of said structural beam and to measure any twist angle between the measuring beam and the reference line in the anchor coordinate system due to said twisting and bending movements; and a linear measuring device that provides measurements needed to determine the changes in endpoint-to-endpoint linear distance of the structural beam, as a function of loading of the structural beam.

2. A mechanism according to claim 1 in which said means to support the measuring beam includes a sliding mechanism that allows the measuring beam to accommodate to any distance change between the points at which it is supported and in which the linear measuring device includes sensing means to note the change in the endpoint-to-endpoint linear distance of the structural beam.

3. A mechanism according to claim 2 wherein the measuring beam is attached to said anchor by a base device which allows the free end of the measuring beam to trace out any point on a sphere, as well as twist about its own length, said base device having three mutually orthogonal axes of rotation.

4. A mechanism according to claim 3 in which one end of said measuring beam is attached to said one end of the structural beam by an end device which allows the measuring beam to remain pinned to said one end of the structural beam, but does not allow the structural beam to impose any loads on the measuring beam, said end device having two mutually orthogonal axes of rotation, neither of which is parallel to the length dimension of the measuring beam.

5. A mechanism according to claim 4 in which the angular measuring means includes a plurality of angular measuring devices, one such device being associated with each axis of rotation of the base device and operable to measure angular rotation about the associated axis of said base device and said end device.

6. A mechanism according to claim 5 in which said linear measuring device includes means to measure slide of the measuring beam along said sliding mechanism to provide a measure of said linear distance.

7. A mechanism according to claim 2 in which said linear measuring device includes means to determine the amount of slide of the measuring beam along said sliding mechanism to provide a measure of said linear distance.

8. A mechanism according to claim 2 that comprises a measuring beam disposed essentially parallel to the structural beam.

9. A mechanism according to claim 8 wherein the structural beam is hollow and wherein the measuring beam is disposed within the structural beam.

10. A mechanism according to claim 2 wherein the measuring beam is disposed at an angle to the structural beam.

11. A mechanism according to claim 5 wherein the angular measuring means includes a small angular measuring device that comprises a small beam attached to each of said base device and said end device such that a rotation of the measuring beam about an axis of either of said base device and said end device that will never be greater or less than plus or minus ten angular degrees causes a distance change between the measuring beam and a point of the particular small beam, said distance change being measured by a linear measuring device which allows for the determination of the above-said small angle.

12. A mechanism according to claim 6 that includes a plurality of structural beams and a corresponding plurality of measuring beams that form a linkage.

13. A mechanism according to claim 12 wherein the anchor of a succeeding structural beam is the endpoint of the previous structural beam.

14. A mechanism according to claim 12 in which the axes of rotation of the end device of the measuring beam associated with the penultimate structural beam is coincident with two of the axes of the base device of the ultimate measuring beam that are not parallel to the length of the ultimate measuring beam, that is, the measuring beam associated with the ultimate structural beam has null axes, thereby rigidly connecting the ultimate measuring beam to the free, load-bearing end of the ultimate structural beam.

15. A device according to claim 14 in which the device of the penultimate measuring beam and the base device of the ultimate measuring beam form a free-floating structure that is supported only by said measuring beam.

16. A device according to claim 12 wherein the end device of a preceding measuring beam has at least one axis coincident with an axis of the base device of the succeeding measuring device to form a union, said union being supported by the structural joint that connects the associated structural beam.

17. A device according to claim 16 wherein at least one of said union is free-floating, that is, not supported by an associated structural joint.

18. A mechanism according to claim 12 that includes a controller that is remotely programmable to direct the linkage to reach any desired point in a desire region within a specified accuracy tolerance, which controller uses information supplied by the measuring beam, and angular and linear measuring devices to determine the location and orientation of said linkage irrespective of loads applied to or configuration of said linkage.

19. A robot comprising a linkage in the form of a plurality of articulating links, each link comprising a structural beam and an associated measuring beam, connecting means to attach the measuring beam to its associated structural beam such that a plurality of degrees of freedom is allowed between each measuring beam and its associated structural beam such that deflections of the associated structural beam do not impose any significant loads on the measuring beam, which deflections include small bending movements about transverse axes that effect small changes in the length and curvature of the structural beam and small twisting movements of the structural beam along its longitudinal axis, and means to detect small operative linear distance changes between endpoints of the structural beam by virtue of said bending movements and small angular changes between the measuring beam and the structural beam by virtue of said twisting movements.

20. A robot according to claim 19 wherein each measuring beam is disposed from joint to joint in the linkage with respect to the associated structural beam, being pinned at each end at a known point in the vicinity of the respective joint axis of the associated structural beam, one end of each measuring beam being free to move translationally with respect to its associated structural beam.

21. A robot according to claim 20 wherein each measuring beam is free to rotate and translate with respect to its associated structural beam such that the structural beam can impose no loads on the measuring beam.

22. A robot according to claim 21 wherein said means to detect includes a linear measuring means to measure the amount of slide of each measuring beam as it moves translationally.

23. A robot according to claim 22 wherein said means to detect includes angular measuring means at each joint axis of each measuring beam to measure the angle between a reference line that is established with respect to a reference coordinate system of the robot to establish position in space and/or orientation in space of the end point of said linkage with respect to said reference line and also with respect to a reference point in the coordinate system.

24. A robot according to claim 23 wherein each measuring beam is disposed within its associated structural beam, the longitudinal axis of the measuring beam coinciding essentially with the longitudinal axis of the structural beam and wherein the linear measuring means measures changes in the effective length of the measuring beam between its pinning points due to deflections of the associated structural beam and the angular measuring means measures any changes in angular positioning between the measuring beam and its associated structural beam.

25. A robot according to claim 20 in which at least one structural beam is a composite comprising two coaxially-disposed structural beams connected together by an electric motor that serves to rotate one with respect to the other and in which at least one said measuring beam is a composite comprising two coaxially-oriented measuring beam components connected by an encoder and disposed within the associated structural beam, pinning to the associated structural beam being at the end of the beam component not attached together by the encoder.

26. A robot according to claim 19 in which the last link of the linkage is short and has an end effector at its free end, and in which the measuring beam of said last link is connected to the measuring beam of the penultimate link through a joint that is free-floating, that is, said joint is supported by the structural beam of the last link through said end effector and the measuring beam of the last link.

27. A robot according to claim 26 in which the measuring beam of the last link is a composite comprising two measuring beam components colinearly connected by an encoder.

28. A mechanism according to claim 1 in which the means to support comprises structures disposed at the joint axes of the measuring beam and in which the means to support provides six degrees of freedom between the structural beam and its associated measuring beam.

29. For use in an articulating linkage of a robot, a link that comprises an elongate structural beam, an associated measuring beam extending axially along the length of the structural beam, support means connecting the measuring beam at each end thereof to the respective end of the structural beam, said support means providing a support free of any significant loads on the measuring beam due to deflections of the structural beam, which deflections include small bending movements about transverse axes that effect small changes in the length and curvature of the structural beam and small twisting movements of the structural beam along its longitudinal axis, and means to detect small operative linear distance changes between endpoints of the structural beam by virtue of said bending movements and small angular changes between the measuring beam and the structural beam by virtue of said twisting movements.

30. Apparatus according to claim 29 in which the articulating linkage comprises several links each of which is like said link.

31. Apparatus according to claim 30 in which the structural beam is hollow, in which the measuring beam is colinear with and disposed within the structural beam associated therewith and in which the structural beam can rotate through small angles with respect to the associated measuring beam by virtue of said twisting movement.

32. Apparatus according to claim 29 in which the structural beam is adapted to support a load at one end thereof and is rotatably connected at the other end thereof to an anchor which provides a reference coordinate system, said apparatus including drive means connected to achieve controlled angular movement of the structural beam with respect to the anchor.

33. Apparatus according to claim 32 in which the articulating linkage comprises several links each of which is like said link, said linkage, therefore, comprising several structural beams and several measuring beams forming an articulated structure, there being angular motion between successive structural beams of the articulated structure.

34. Apparatus according to claim 33 having an end effector at the endpoint of the last structural beam and a drive motor at each joint to effect angular motion of the structural beams with respect to one another, said apparatus including measuring means adapted to provide exact endpoint location and orientation of the end effector.

35. Apparatus according to claim 19 in which the associated measuring beam extends substantially as a straight line from joint to joint in said each link and in which the connecting means attaches the associated measuring beam to the structural beam at each joint axis of the structural beam, said apparatus including a motor interconnected to the structural beam at said each joint axis and operable to effect angular movement of the structural beam at the said each joint axis.

36. Apparatus according to claim 35 in which the structural beam can bend in small movement in two directions, vertically and horizontally, as well as twist about its longitudinal axis in small twisting movement, the bending and twisting movements of the structural beam constituting said deflections, said apparatus including measuring means, which includes said measuring beam, operable to sense the small movements of the structural beam with respect to the associated measuring beam by virtue of said bending and twisting and further including means to calculate the amount of said movement.

37. Apparatus according to claim 36 in which one end of the first link of said plurality of articulating links is anchored to an anchor which serves as a reference coordinate system, in which the last link of the plurality of articulating links has secured to its free end an end effector and in which the means to calculate is adapted to determine the location of the end effector and its precise orientation in space.

38. Apparatus according to claim 37 in which the measuring means is operable to sense one large degree of freedom and five small degrees of freedom, the large degree of freedom being said angular movement at each said joint axis and the five small degrees of freedom being by virtue of the deflection of the structural beam due to bending of the structural beam and twisting of the structural beam.

* * * * *